(12) United States Patent
Lynch

(10) Patent No.: US 6,233,672 B1
(45) Date of Patent: *May 15, 2001

(54) PIPING ROUNDING MODE BITS WITH FLOATING POINT INSTRUCTIONS TO ELIMINATE SERIALIZATION

(75) Inventor: Thomas W. Lynch, Austin, TX (US)

(73) Assignee: Advanced Micro Devices, Inc., Sunnyvale, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/812,026

(22) Filed: Mar. 6, 1997

(51) Int. Cl.$^7$ ........................................ G06F 9/38
(52) U.S. Cl. ........................ 712/222; 708/497; 708/510
(58) Field of Search ........................ 395/563; 364/748.03, 364/745.02, 748.16; 712/222; 708/497, 510, 585, 496

(56) References Cited

U.S. PATENT DOCUMENTS

| 4,044,338 | 8/1977 | Wolf . |
| 4,453,212 | 6/1984 | Gaither et al. . |
| 4,807,115 | 2/1989 | Torng . |
| 4,858,105 | 8/1989 | Kuriyama et al. . |
| 4,893,233 | * 1/1990 | Denman et al. ............... 395/591 |

(List continued on next page.)

FOREIGN PATENT DOCUMENTS

| 0259095 | 3/1988 | (EP) . |
| 0381471 | 8/1990 | (EP) . |
| 0459232 | 12/1991 | (EP) . |
| 2263985 | 8/1993 | (GB) . |
| 2263987 | 8/1993 | (GB) . |
| 2281422 | 3/1995 | (GB) . |

OTHER PUBLICATIONS

Intel, "Chapter 2: Microprocessor Architecture Overview," pp. 2–1 through 2–4.
Michael Slater, "AMD's K5 Designed to Outrun Pentium," Microprocessor Report, vol. 8, No. 14, Oct. 24, 1994, 7 pages.
Sebastian Rupley and John Clyman, "P6: The Next Step?," PC Magazine, Sep. 12, 1995, 16 pages.
Tom R. Halfhill, "AMD K6 Takes On Intel P6," BYTE, Jan. 1996, 4 pages.

Primary Examiner—Meng-Ai T. An
Assistant Examiner—Gautam R. Patel
(74) Attorney, Agent, or Firm—Conley, Rose & Tayon, PC; B. Noel Kivlin

(57) ABSTRACT

A floating point unit is provided which conveys the rounding mode in effect upon dispatch of a particular instruction with that particular instruction into the execution pipeline of the floating point unit. Upon dispatch of a control word update instruction into the execution pipeline, the rounding mode is updated according to the updated control word provided for the control word update instruction. Instructions subsequent to the control word update instruction thereby receive the updated rounding mode as those instructions are dispatched. The updated rounding mode is available to the subsequent instructions prior to retiring the control word update instruction. The rounding mode is therefore updated without serializing the update. If the control word update instruction modifies the value in a field other than the rounding mode, the instructions subsequent to the control word update instruction may be discarded and re-executed subsequent to updating the control word register with the updated control word. In this manner, the control word update is effectively serialized for cases in which a field other than the rounding mode is updated.

13 Claims, 10 Drawing Sheets

U.S. PATENT DOCUMENTS

| | | |
|---|---|---|
| 4,928,223 | 5/1990 | Dao et al. . |
| 5,053,631 | 10/1991 | Perlman et al. . |
| 5,058,048 | 10/1991 | Gupta et al. . |
| 5,129,067 | 7/1992 | Johnson . |
| 5,136,697 | 8/1992 | Johnson . |
| 5,226,126 | 7/1993 | McFarland et al. . |
| 5,226,130 | 7/1993 | Favor et al. . |
| 5,249,149 * | 9/1993 | Cocanougher et al. .......... 364/748.1 |
| 5,257,215 * | 10/1993 | Poon ............................... 364/715.03 |
| 5,600,584 * | 2/1997 | Schlafly ................................ 364/745 |
| 5,761,105 * | 6/1998 | Goddard et al. ................ 364/748.16 |
| 5,812,439 * | 9/1998 | Hansen ........................... 364/748.03 |

\* cited by examiner

| Reserved 162 | Rounding Mode 166 | Precision Control 168 | Reserved 164 | Exception Masks 170 |

US 6,233,672 B1

PIPING ROUNDING MODE BITS WITH FLOATING POINT INSTRUCTIONS TO ELIMINATE SERIALIZATION

BACKGROUND OF THE INVENTION

1. Field of the Invention

This invention relates to the field of microprocessors and, more particularly, to the handling of rounding modes within floating point units of microprocessors.

2. Description of the Related Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Generally speaking, a pipeline comprises a number of stages at which portions of a particular task are performed. Different stages may simultaneously operate upon different items, thereby increasing overall throughput. Although the instruction processing pipeline may be divided into any number of stages at which portions of instruction processing are performed, instruction processing generally comprises fetching the instruction, decoding the instruction, executing the instruction, and storing the execution results in the destination identified by the instruction.

Microprocessors are configured to operate upon various data types in response to various instructions. For example, certain instructions are defined to operate upon an integer data type. The bits representing an integer form the digits of the number. The decimal point is assumed to be to the right of the digits (i.e. integers are whole numbers). Another data type often employed in microprocessors is the floating point data type. Floating point numbers are represented by a significand and an exponent. The base for the floating point number is raised to the power of the exponent and multiplied by the significand to arrive at the number represented. While any base may be used, base 2 is common in many microprocessors. The significand comprises a number of bits used to represent the most significant digits of the number. Typically, the significand comprises one bit to the left of the decimal, and the remaining bits to the right of the decimal. The bit to the left of the decimal is not explicitly stored, instead it is implied in the format of the number. Generally, the exponent and the significand of the floating point number are stored. Additional information regarding the floating point numbers and operations performed thereon may be obtained in the Institute of Electrical and Electronic Engineers (IEEE) standard 754.

Floating point numbers can represent numbers within a much larger range than can integer numbers. For example, a 32 bit signed integer can represent the integers between $2^{31}-1$ and $-2^{31}$, when two's complement format is used. A single precision floating point number as defined by IEEE 754 comprises 32 bits (a one bit sign, 8 bit biased exponent, and 24 bits of significand) and has a range from $2^{-126}$ to $2^{127}$ in both positive and negative numbers. A double precision (64 bit) floating point value has a range from $2^{-1022}$ and $2^{1023}$ in both positive and negative numbers. Finally, an extended precision (80 bit) floating point number has a range from $2^{-16382}$ to $2^{16383}$ in both positive and negative numbers.

The expanded range available using the floating point data type is advantageous for many types of calculations in which large variations in the magnitude of numbers can be expected, as well as in computationally intensive tasks in which intermediate results may vary widely in magnitude from the input values and output values. Still further, greater precision may be available in floating point data types than is available in integer data types.

Floating point data types produce challenges for the microprocessor designer. For example, an arithmetic operation between two floating point numbers may produce a value which is within the floating point numerical range, but cannot be exactly represented within the floating point data type format. Therefore, the result must be rounded to a representable number. Generally speaking, rounding refers to selecting a number which is representable in the target data type format (e.g. single, double, or extended precision) to be the result of a calculation in place of the exact result when the exact result is not representable in the target data format. The rounding may be accomplished in a number of ways. For example, the result can be truncated to fit in the target data format. Alternatively, the nearest representable number to the actual result may be chosen (whether that number is numerically higher or lower than the actual result). Additional alternative rounding modes include rounding up to a numerically larger number, or rounding down to a numerically smaller number. Many other types of rounding modes may be used, including rounding to a lesser precision (i.e. fewer bits of significand), etc.

Instead of choosing only one rounding mode, which may not serve the needs of all users, microprocessors typically allow the user to select the rounding mode. A control word is defined for the microprocessor, and a field within the control word comprises the rounding mode. A special control word update instruction is provided to allow the user to update the control word, including the rounding mode. Generally speaking, the control word stores a number of fields regarding the operating state of the floating point unit. A precision control field may be included, indicating the precision of the results (single, double, or extended). Additionally, exception masking may be stored in the control word. Floating point calculations can produce a variety of exceptions (i.e. conditions which may require corrective action such as discarding the instruction stream and refetching or trapping to a software routine for diagnosis). If a particular exception is unimportant to a particular user, then that exception can be masked in the control word.

Since changing the control word can cause changes in the behavior of the floating point instructions, microprocessors typically "serialize" the pipeline upon the control word update instruction. An instruction is serialized if its execution is delayed until all previous instructions have cleared the instruction processing pipeline and all subsequent instructions are delayed until the instruction clears the instruction processing pipeline. Serialization is therefore a performance-degrading operation.

Unfortunately, certain algorithms rely on repeatedly changing the rounding mode of the floating point unit. For example, interval arithmetic is often used to compute an upper and lower bound of a correct result, given that the exact result often cannot be represented. For interval arithmetic, the rounding mode is different when computing the upper bound than when computing the lower bound. Therefore, the performance of interval arithmetic suffers because changing the rounding mode causes serialization. Other algorithms which change the rounding mode often similarly suffer performance degradation.

SUMMARY OF THE INVENTION

The problems outlined above are in large part solved by a floating point unit in accordance with the present invention. The floating point unit conveys the rounding mode in effect upon dispatch of a particular instruction with that particular instruction into the execution pipeline of the floating point unit. Upon dispatch of a control word update instruction into the execution pipeline, the rounding mode is updated according to the updated control word provided for the control word update instruction. Each instruction receives a copy of the rounding mode appropriate at the time of issue of that instruction. For example, in an in-order embodiment of a floating point unit, instructions subsequent to the control word update instruction receive the updated rounding mode as those instructions are dispatched. Advantageously, the updated rounding mode is available to the subsequent instructions prior to completion of the control word update instruction. The rounding mode is therefore updated without serializing the update. Advantageously, applications which change the rounding mode often may experienced increased performance due to the lack of serialization upon rounding mode updates.

If the control word update instruction modifies the value in a field other than the rounding mode, the instructions subsequent to the control word update instruction may be discarded and re-executed subsequent to updating the control word register with the updated control word. In this manner, the control word update is effectively serialized for cases in which a field other than the rounding mode is updated. The control word update instruction may provide the updated control word in a number of manners. For example, the updated control word may be an immediate field of the control word update instruction. Alternatively, the updated control word may be implicit in the opcode of the instruction or may be a memory or register operand.

Broadly speaking, the present invention contemplates a floating point unit for a microprocessor comprising an execution pipeline and a rounding mode storage. Coupled to the execution pipeline, the rounding mode storage is configured to store a rounding mode indicative of a type of rounding to be applied to results of floating point instructions. The execution pipeline is configured to convey the rounding mode along with a particular instruction dispatched into the execution pipeline. Additionally, the execution pipeline is configured to round a particular result corresponding to the particular instruction according to the rounding mode.

The present invention further contemplates a method for performing rounding in a floating point unit. A current rounding mode is conveyed with a floating point instruction into an execution pipeline of the floating point unit. The current rounding mode is updated to an updated rounding mode upon dispatch of a control word update instruction into the execution pipeline. The updating is performed in a non-serialized manner.

The present invention still further contemplates a microprocessor comprising a floating point unit and a reorder buffer. The floating point unit includes an execution pipeline into which the floating point unit is configured to convey a rounding mode along with each instruction. Additionally, the floating point unit is further configured to update the rounding mode in response to a control word update instruction without serialization. Coupled to the floating point unit, the reorder buffer is configured to process instruction exceptions. Furthermore, the reorder buffer is further configured to convey a cancel indication to the floating point unit if one or more floating point instructions are canceled in response to one of the instruction exceptions.

BRIEF DESCRIPTION OF THE DRAWINGS

Other objects and advantages of the invention will become apparent upon reading the following detailed description and upon reference to the accompanying drawings in which.

Figure 1:
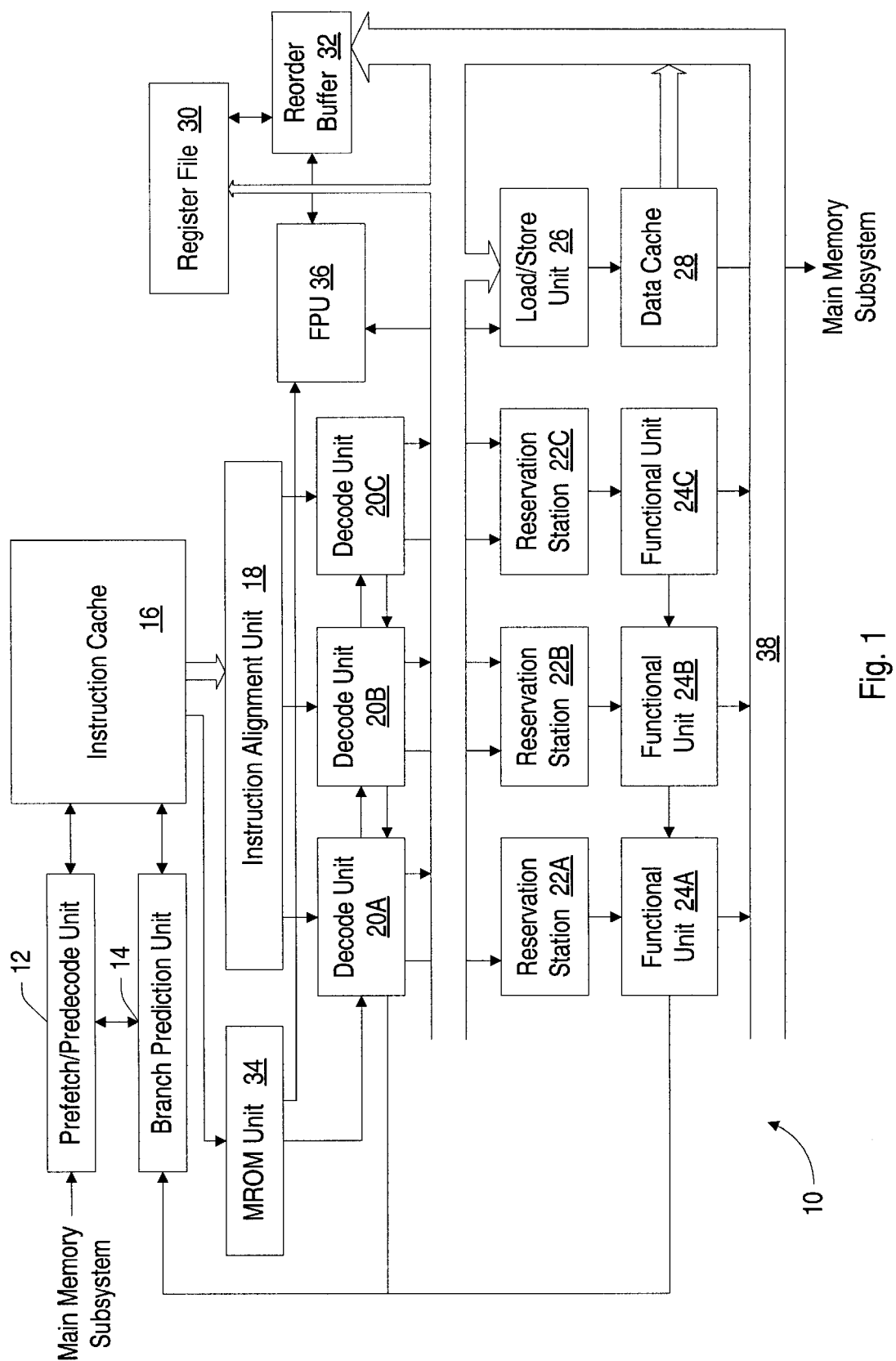
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

Detailed Description of the Invention

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, an MROM unit 34, and a floating point unit (FPU) 36. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. MROM unit 34 is coupled to decode units 20 and FPU 36. Finally, FPU 36 is coupled to load/store unit 26 and reorder buffer 32.

Generally speaking, FPU 36 is configured to execute floating point instructions. FPU 36 includes an execution pipeline for executing the instructions. Along with conveying the instructions through the execution pipeline, FPU 36 also conveys the rounding mode relevant to the instructions. If a control word update instruction is detected, an updated rounding mode from the updated control word supplied for the control word update instruction is noted by FPU 36 when the control word update instruction is dispatched into the instruction processing pipeline. Instructions subsequent to the control word update instruction receive the updated rounding mode as the subsequent instructions are dispatched into the execution pipeline. Advantageously, the control word update instruction is not serialized. Performance of instruction code sequences which update the rounding mode often may thereby be increased. If, upon retiring the control word update instruction and updating the control word of FPU 36, other fields of the control word besides the rounding mode are updated, the instructions subsequent to the control word update instruction can be discarded and reexecuted.

The copy of the rounding mode noted by FPU 36 is updated to the current rounding mode stored in the control word upon cancellation of a control word update instruction from the execution pipeline. In this manner, the copy of the rounding mode is resynchronized to the current rounding mode after being erroneously updated. When the control word update instruction is canceled from the execution pipeline, the instructions subsequent to the control word update instruction within the execution pipeline are also canceled or are to be canceled in a subsequent clock cycle. Therefore, correcting the copy of the rounding mode is sufficient for correcting the effects of pipelining the rounding mode with each instruction.

According to one embodiment of microprocessor 10, floating point instructions are classified as MROM (i.e. microcode) instructions for instruction fetching and dispatch purposes in instruction cache 16. The floating point instructions are routed to MROM unit 34. MROM unit 34 parses the floating point instruction into a floating point operation which is transmitted to floating point unit 36 and one or more load/store operations for load/store unit 26 to perform to retrieve memory operands for the instruction. As used herein, a "memory operand" of an instruction is an operand which is stored in a memory location (as opposed to a register within microprocessor 10 ). The memory operand is located via an address formed by adding one or more of the following: the contents of one or two registers, an immediate field of the instruction, and a displacement field of the instruction.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in a 4 way set associative structure having 32 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing a variable byte length instruction set will next be described. A variable byte length instruction set is an instruction set in which different instructions may occupy differing numbers of bytes. An exemplary variable byte length instruction set employed by one embodiment of microprocessor 10 is the x 86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

| | |
|---|---|
| Start bits | 10000 |
| End bits | 00001 |
| Functional bits | 11000 |

According to one particular embodiment, early identifying that an instruction includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which case subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34 ) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A.

Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if both: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
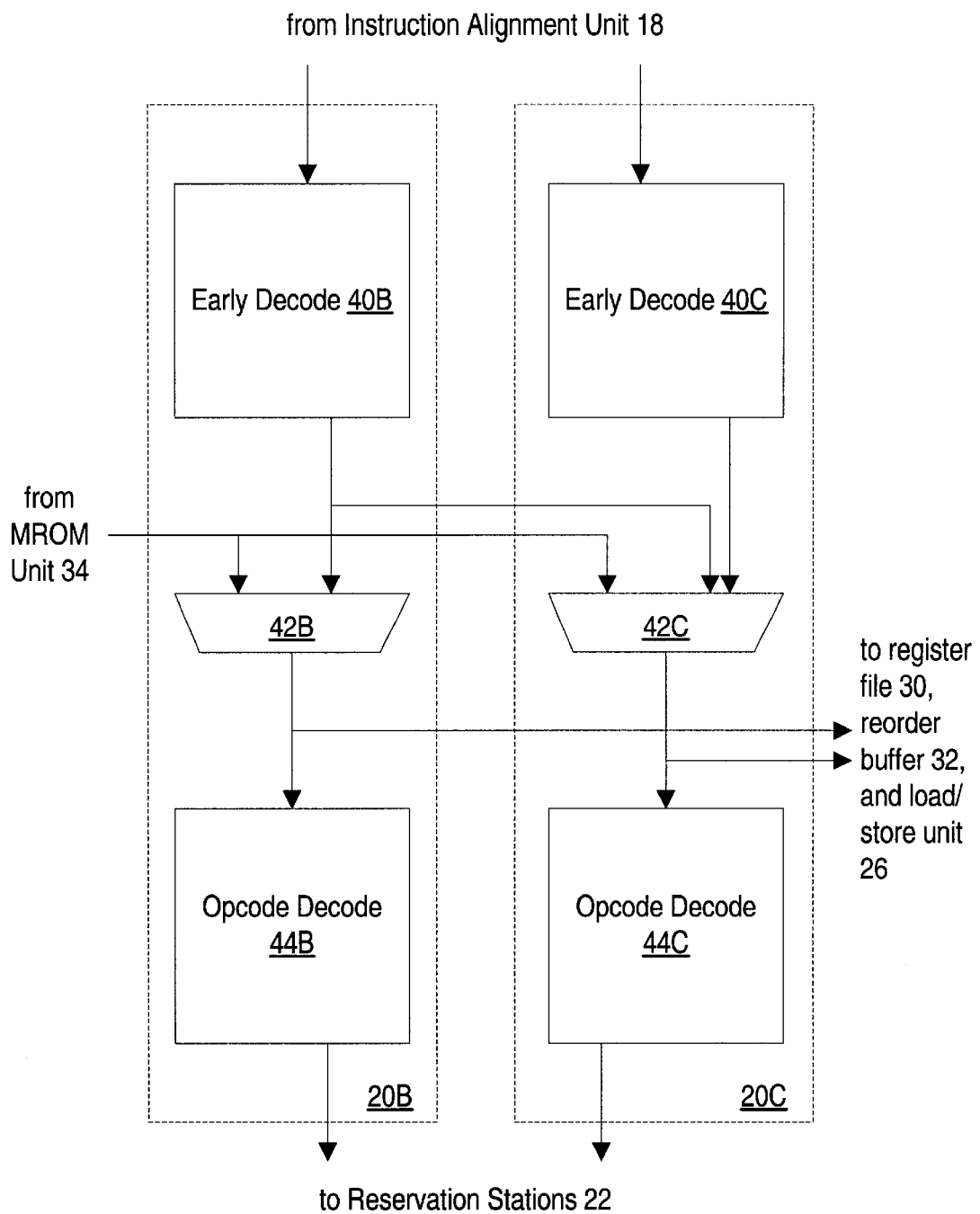
FIG. 2 is a block diagram of one embodiment of a pair of decode units shown in FIG. 1.

Turning now to FIG. 2, a block diagram of one embodiment of decode units 20B and 20C is shown. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexor 42B, and opcode decode unit 44B. Similarly, decode unit 20C includes early decode unit 40C, multiplexor 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexor 42B is included for selecting between the instructions provided by MROM unit 34 and by early decode unit 40B. During times in which MROM unit 34 is dispatching instructions, multiplexor 42B selects instructions provided by MROM unit 34. At other times, multiplexor 42B selects instructions provided by early decode unit 40B. Similarly, multiplexor 42C selects between instructions provided by MROM unit 34, early decode unit 40B, and early decode unit 40C. The instruction from MROM unit 34 is selected during times in which MROM unit 34 is dispatching instructions. During times in which the early decode unit within decode unit 20A (not shown) detects a double dispatch instruction, the instruction from early decode unit 40B is selected by multiplexor 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;
(ii) decode unconditional branch instructions (which may include the unconditional jump, the CALL, and the RETURN) which were not detected during branch prediction;
(iii) decode source and destination flags;
(iv) decode the source and destination operands which are register operands and generate operand size information; and
(v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexors 42 are routed to register file 30 and reorder buffer 32. Operand values or tags may thereby be routed to reservation stations 22. Additionally, memory operands are detected by early decode units 40. Therefore, the outputs of multiplexors 42 are routed to load/store unit 26. Memory operations corresponding to instructions having memory operands are stored by load/store unit 26.

Figure 3:
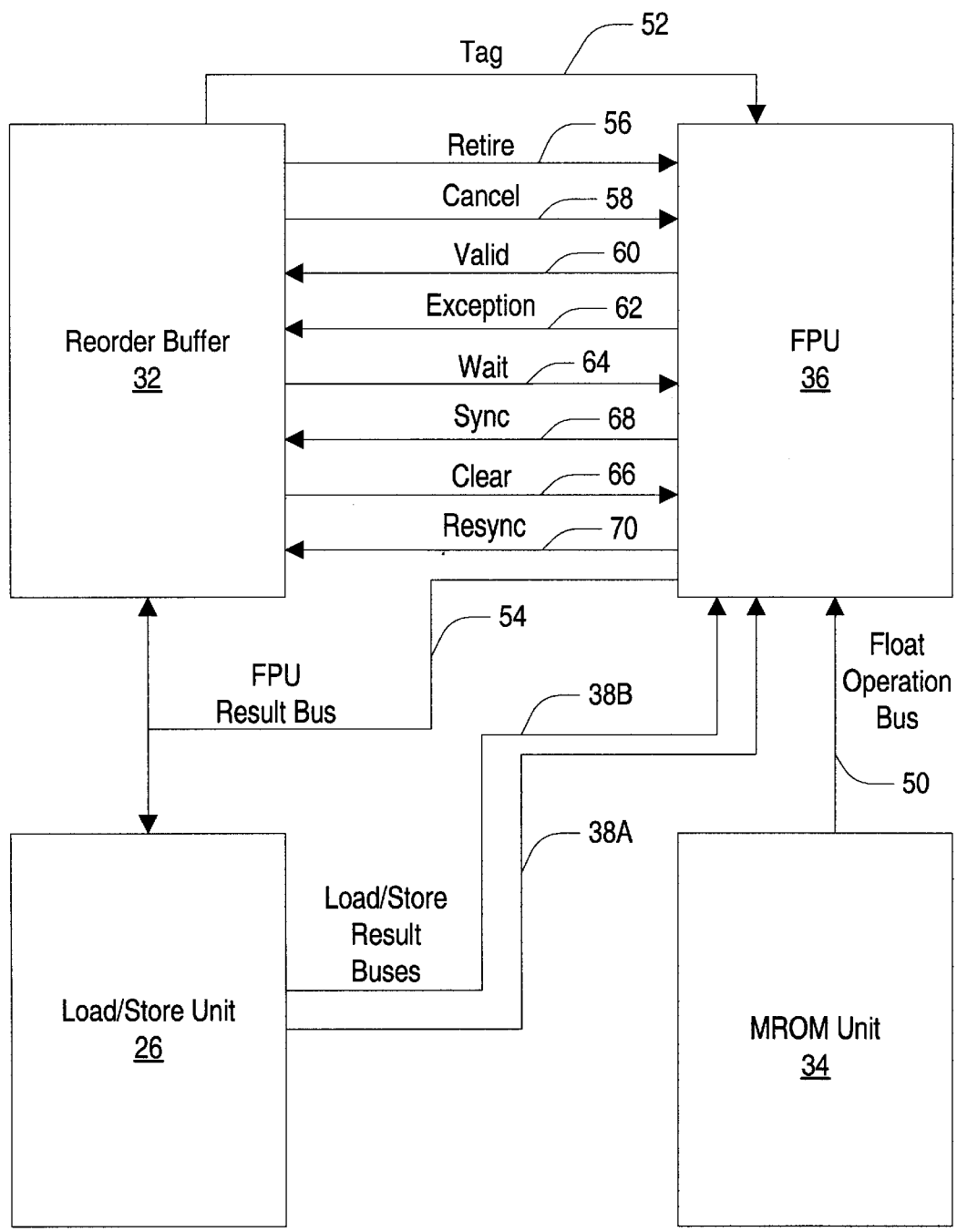
FIG. 3 is a block diagram of a floating point unit, a reorder buffer, a load/store unit, and an MROM unit shown in FIG. 1, highlighting interconnection therebetween according to one embodiment of the microprocessor.

Turning now to FIG. 3, a block diagram of load/store unit 26, reorder buffer 32, FPU 36, and MROM unit 34 is shown. Interconnection between the blocks is highlighted in FIG. 3 according to one embodiment of microprocessor 10. Additional interconnection may be provided as desired according to design choice.

As mentioned above, MROM unit 34 receives floating point instructions from instruction cache 16 and parses the floating point instruction into a floating point operation and memory operations to retrieve and store memory operands for the instructions. Additionally, certain floating point instructions may require activity other than memory operations from functional units 24. For example, a floating point instruction defined to store the floating point state to a set of memory locations may access one or more registers which are not configured into FPU 36. As a more particular example, the instruction pointer may be maintained within reorder buffer 32 according to one embodiment, and the instruction pointer is part of the floating point state. MROM unit 34 parses such instructions into integer instructions to be executed by functional units 24.

MROM unit 34 provides the floating point operation upon a float operation bus 50 coupled between MROM unit 34 and FPU 36. The floating point operation includes the opcode, which defines the requested floating point operation, and register specifiers for any register operands used by the instruction. The memory operand, if one is included in the instruction, is provided by load/store unit 26. Concurrent with MROM unit 34 providing the floating point operation, MROM unit 34 provides the memory operation instructions between early decode units 40 and opcode decode units 44, as shown in FIG. 2. Reorder buffer 32 provides the reorder buffer tag assigned to the memory operations upon a tag bus 52 coupled between reorder buffer 32 and FPU 36. According to the present embodiment, reorder buffer 32 is a line-oriented reorder buffer as described above. For such an embodiment, reorder buffer 32 provides the line tag upon tag bus 52. Using the supplied tag, FPU 36 can identify the memory operand data as it is provided from load/store unit 26.

Load/store unit 26 provides memory operand data upon load/store result bus 38 A and 38 B. Result buses 38 A and 38 B may comprise a portion of result buses 38. Alternatively, load/store result buses 38 may comprise dedicate buses for providing values to FPU 36. Each load/store result bus 38A and 38B is capable, in one embodiment, of providing a 32 bit data word and a reorder buffer tag identifying the data word. The reorder buffer tag comprises both the line and offset portions. The line portion identifies the floating point instruction to which the data word belongs, and the offset portion defines the portion of the memory operand being provided by the data word. A floating point memory operand may comprise as many as 80 bits, requiring up to two 32 bit data words and a 16 bit data word from load/store unit 26.

FPU 36 may provide results to either reorder buffer 32 or load/store unit 26. For example, a destination for an instruction may be a memory location. FPU 36 communicates the result of the instruction upon FPU result bus 54 to load/store unit 26 for storage. Additionally, a floating point instruction is defined which causes a floating point value to be stored into an integer register (specifically, the AX register of the x86 microprocessor architecture, in one embodiment). FPU result bus 54 is therefore coupled to reorder buffer 32. The floating point registers are configured within FPU 36, allowing floating point results to be stored therein for floating point instructions having targets within the floating point registers.

Reorder buffer 32 coordinates the in-program-order retirement of instructions. Since floating point instructions often retire within FPU 36, an interface between reorder buffer 32 and FPU 36 is used for communicating the retirement of floating point instructions. The interface provides a loose coupling between FPU 36 and reorder buffer 32 such that one unit can get "ahead of" the other. For example, reorder buffer 32 may indicate that a particular instruction can be retired and FPU 36 may not yet have executed the instruction. FPU 36 may accept a retirement indication for the instruction if the instruction will not create an exception, and retire the instruction internal to FPU 36 upon completion. Similarly, FPU 36 can complete instructions and buffer them internally until a reorder buffer 32 retires (or cancels) the instructions.

The signals employed according to one embodiment of the loosely coupled interface are shown in FIG. 3. A retire signal is conveyed by reorder buffer 32 upon a retire conductor 56 coupled to FPU 36. Reorder buffer 32 conveys a cancel signal upon a cancel conductor 58 coupled to FPU 36. FPU 36 conveys a valid signal upon a valid conductor 60 and an exception signal upon an exception conductor 62, both of which are coupled to reorder buffer 32. Reorder buffer 32 provides a wait signal upon a wait conductor 64 and a clear signal upon a clear conductor 66, both of which are coupled to FPU 36. Finally, FPU 36 provides a sync signal upon a sync conductor 68 and a resync signal upon a resync conductor 70, both of which are coupled to reorder buffer 32.

The retire, cancel, valid, and exception signals provide the basic interface for retiring and canceling instructions. Reorder buffer 32 asserts the retire signal when a floating point instruction is to be retired. The retire signal is asserted for each floating point instruction in program order, allowing a single signal to be used. Alternatively, an instruction can be canceled (i.e. discarded from the execution pipeline within FPU 36 ) via assertion of the cancel signal. FPU 36 may be configured to store an assertion of the retire signal until the corresponding instruction is completed by FPU 36 (i.e. until the instruction exits the execution pipeline of FPU 36 ). Once the retire signal has been asserted for a given instruction, FPU 36 may proceed with updating the destination register with the result of the instruction (provided certain floating point exceptions are masked).

FPU 36 provides the status of each instruction using the valid signal and the exception signal. If an instruction completes without creating an exception, the valid signal is asserted for that instruction. If the instruction does create an exception, the exception signal is asserted. Similar to the retire signal assertions, assertions of the valid and/or exception signals are queued by reorder buffer 32 and associated with floating point instructions in program order.

The wait and sync signals are used to implement a floating point synchronization instruction (e.g. FWAIT in the x86 microprocessor architecture). A floating point synchronization instruction is used to synchronize the floating point and the integer portions of microprocessor 10. Particularly, floating point exceptions are inexact. The floating point synchronization instruction can be used to check for any exceptions with respect to a particular floating point instruction. When the floating point synchronization instruction is ready to be retired, reorder buffer 32 asserts the wait signal. FPU 36 asserts the sync signal when FPU 36 is synchronized. Upon assertion of both signals, the floating point synchronization instruction is complete.

The resync signal is used to delete speculative state (i.e. discard any remaining instructions within reorder buffer 32) and refetch instructions starting with the next instruction after the instruction which is foremost, in program order, within reorder buffer 32. The foremost instruction within reorder buffer 32 is retired. The clear signal is used by reorder buffer 32 in a similar fashion: if the clear signal is asserted, FPU 36 deletes any speculative state stored therein.

Figure 4:
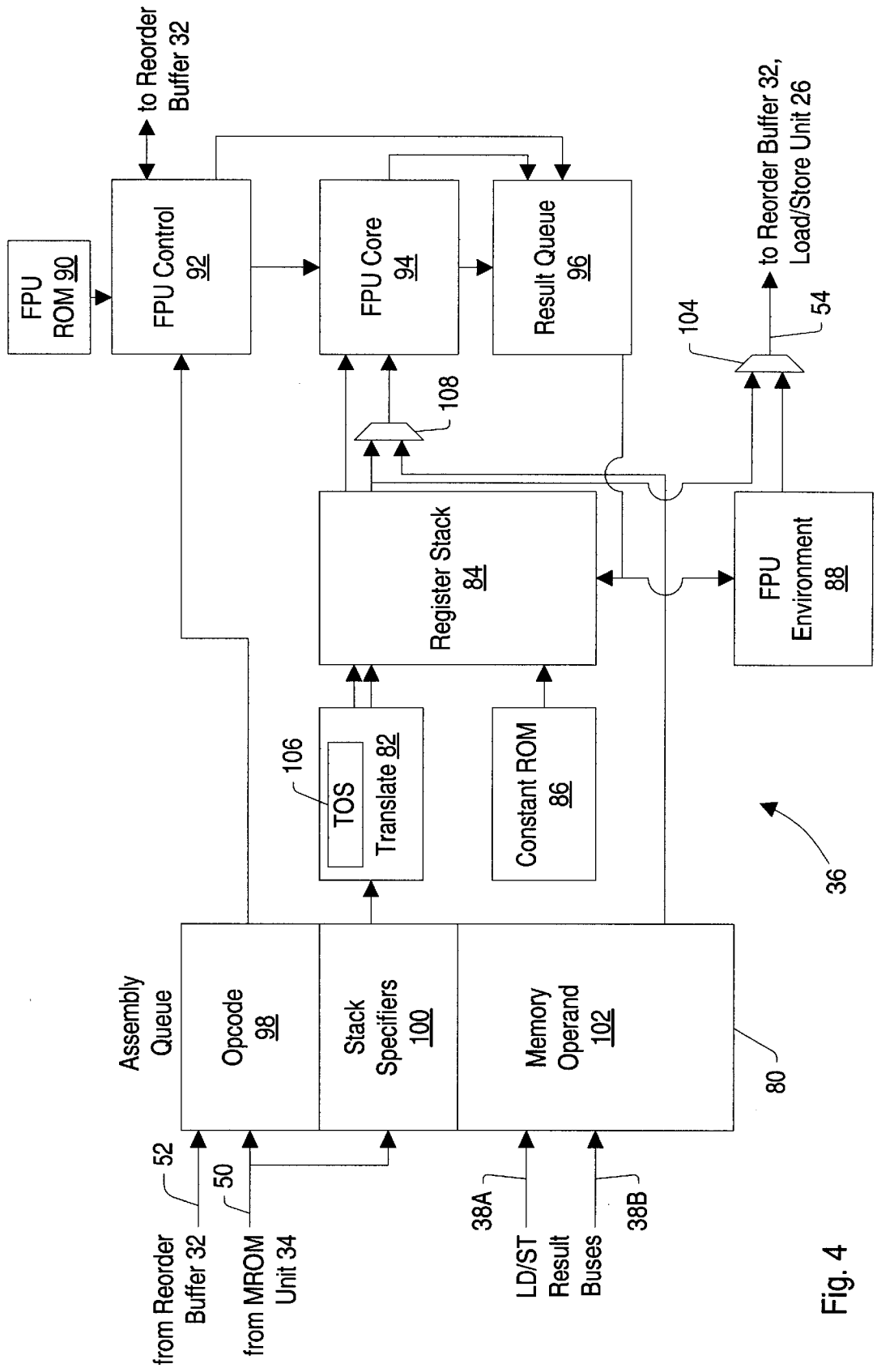
FIG. 4 is a block diagram of one embodiment of the floating point unit shown in FIG. 3.

Turning next to FIG. 4, a block diagram of one embodiment of FPU 36 is shown. As shown in FIG. 4, FPU 36 includes an assembly queue 80, and translate unit 82, a register stack 84, a constant read-only memory (ROM) 86, an FPU environment unit 88, an FPU ROM 90, an FPU control unit 92, and FPU core 94, and a result queue 96. Assembly queue 80 comprises multiple queue entries, each of which is configured to store instruction information corresponding to one instruction. As shown in FIG. 4, assembly queue 80 includes several fields for each entry. An opcode field 98 is included for storing the opcode of the floating point instruction and the corresponding reorder buffer tag, and a stack specifiers field 100 is included for storing register specifiers which select storage locations within register stack 84. The selected registers provide operands for the corresponding instructions. The values stored in opcode field 98 and stack specifier field 100 are received by FPU 36 upon float operation bus 50 from MROM unit 34 and tag bus 52 from reorder buffer 32. Assembly queue 80 further includes a memory operand field 102 for storing a memory operand used by the instruction. The memory operand is received upon load/store result buses 38A and 38B.

Assembly queue 80 is coupled to FPU control unit 92 and to translate unit 82. Translate unit 82 is coupled to register stack 84, which is further coupled to constant ROM 86, result queue 96, and FPU core 94. FPU environment 88 is coupled to result queue 96 and is coupled to provide, through multiplexor 104, a result upon FPU result bus 54. Register stack 84 may also provide a result upon FPU result bus 54 through multiplexor 104. FPU control unit 92 is coupled to FPU ROM 90, result queue 96, and FPU core 94. FPU core 94 is further coupled to result queue 96. FPU control unit 92 is further coupled to receive the signals forming the interface between FPU 36 and reorder buffer 32 (e.g. the signals upon conductors 52, 56, 58, 60, 62, 64, 66, 68, and 70).

Generally speaking, instructions and their corresponding memory operands are received into assembly queue 80. Instructions are dispatched from assembly queue 80 into the execution pipeline of FPU 36. Upon exit from the execution pipeline, the results of the instruction are stored into result queue 96. The results are held in result queue 96 until a retire indication is received from reorder buffer 32. Upon receipt of the retire indication, the results are stored into register stack 84 (or FPU environment 88, if the destination of the instruction is an FPU environment register such as the control word or the status word).

When an instruction is dispatched into the execution pipeline, the stack specifiers for the instruction are conveyed to translate unit 82. FPU 36 uses a stack-based register file in which one of the registers is defined to be the top of the stack. Certain instructions are defined to push a value onto or pop a value from the stack. Pushing a value onto the stack comprises storing the value into a register adjacent to the register which is currently the top of the stack and making that adjacent register the top of the stack. Popping a value from the stack comprises reading the value from the register which is currently the top of the stack and making the stack pointer indicate an adjacent register. Most of the floating point instructions use stack-relative register specifiers (i.e. the specifier indicates the register which is the top of the stack or the register which is at a particular offset from the top of the stack). Therefore, the register specifier is somewhat dependent upon the instructions which execute prior to that instruction (since these instructions may affect which register is the top of the stack). Translate unit 82 maps the stack specifiers to the registers within register stack 84 based upon a speculative top of stack value which reflects execution of the instructions prior to a particular instruction in program order (including the instructions still within the execution pipeline of FPU 36). A top of stack (TOS) register 106 is included for storing the top of stack indicator. Additionally, a table is provided within translate unit 82 for mapping each register to its stack relative position. Registers may become out of order in the stack due to an exchange instruction which exchanges the contents of a pair of registers. Such an instruction may be implemented by swapping their addresses within the table instead of physically swapping the contents of the corresponding registers.

Translate unit 82 provides the translated register specifiers to register stack 84, which reads the values from the corresponding register locations and provides the values to FPU core 94. The memory operand for the instruction may be substituted for one of the operands from register stack 84 via multiplexor 108. Register stack 84 includes the architected FPU registers defined by the microprocessor architecture employed by microprocessor 10. For example, embodiments of microprocessor 10 employing the x86 microprocessor architecture include eight architected registers within register stack 84. Additionally, register stack 84 may include temporary registers for use by floating point microcode routines stored in FPU ROM 90, as described below. In one embodiment, 24 temporary registers are included.

FPU core 94 includes the hardware used to manipulate the source operands of the floating point instruction in order to produce the result of the instruction. For example FPU core 94 includes a multiplier for multiplying the input operands, an adder for adding the input operands, etc. FPU core routes the operands to the various pieces of hardware in response to control signals from FPU control unit 92. FPU control unit 92 receives the opcode for a given instruction from assembly queue 80 and routes the instruction through the execution pipeline accordingly. Certain instructions may not use any of the hardware at a particular stage of the execution pipeline. These instructions are routed around the particular stage, so as to exit the execution pipeline more rapidly. Additionally, FPU control unit 92 handles the interface to reorder buffer 32 and communicates with other elements of FPU 36 according to communications upon the interface. For example, when a particular instruction receives a retire indication, FPU control unit 92 communicates with result queue 96 to cause the corresponding instruction result to be stored into register stack 84. If the instruction has not yet been completed, result queue 96 queues the retire indication until the instruction is completed.

Floating point instructions are classified by FPU 36 into one of two types, according to the present embodiment. The first type (referred to herein as "basic") includes instructions which provide a basic arithmetic operation (such as multiply, add, etc.) or a data movement instruction. Generally, the basic instructions can be completed with one pass through the execution pipeline. On the other hand, the second type (referred to herein as "transcendental") includes instructions which perform a more abstract mathematical function. For example, the transcendental instructions may include the sine and cosine functions, as well as functions such as logarithm and square root. The transcendental functions are implemented using microcoded routines stored in FPU ROM 90. Effectively, the transcendental instructions make multiple passes through the execution pipeline in order to complete. Intermediate results are calculated by the instructions within the microcoded routine, and the final result is formed by calculating upon the intermediate results.

The microcoded routines may make use of a set of constants stored in constant ROM 86. The constants stored in constant ROM 86 are useful in calculating results for the transcendental instructions. For example, the floating point representations of 1, 0, −1, Pi, etc., as well as constants particular to the microcoded routines may be stored in constant ROM 86. The constants may be loaded into temporary registers for use by the microcoded routines. According to one embodiment, constant ROM 86 stores 128 double precision constants and 64 single precision constants.

FPU environment 88 stores control and status information regarding the state of FPU 36. A control word may be stored which indicates the rounding and precision modes of FPU 36 as well as a mask for various floating point exceptions. A status word may also be stored which indicates which floating point exceptions have been detected, the top of stack pointer, etc.

According to one particular embodiment, FPU 36 executes instructions in program order. The instructions are received into assembly queue 80 in program order, and are provided into the execution pipeline of FPU 36 in program order as well. An instruction may be ready for execution within assembly queue 80 (i.e. all operands provided) but may remain stored therein because another instruction prior the instruction in program order is not ready for execution. In other words, assembly queue 80 operates as a first-in, first-out (FIFO) buffer. Similarly, results are stored from result queue 96 into register stack 84 and/or FPU environment 88 in program order.

Figure 5:
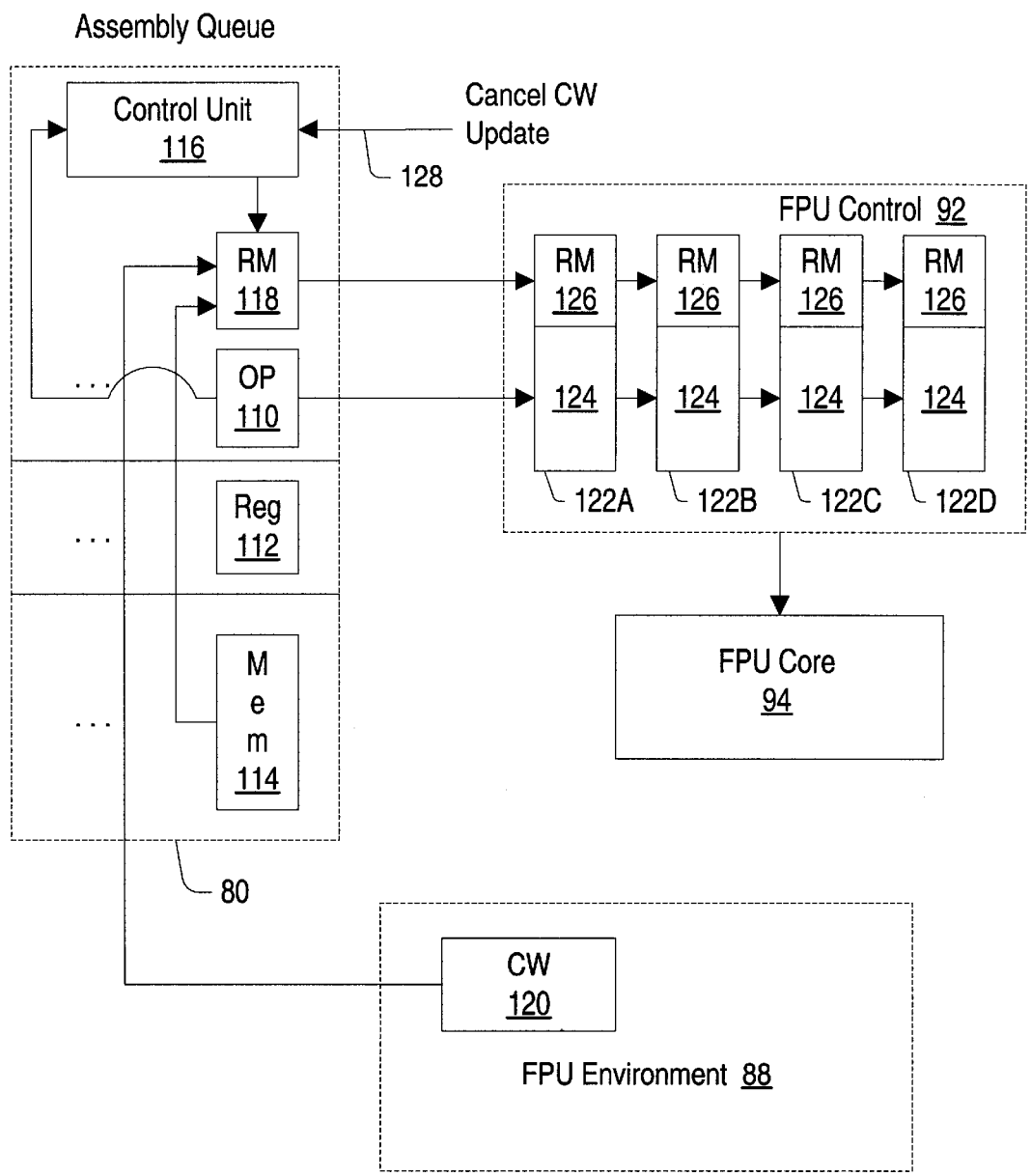
FIG. 5 is a diagram of portions of a first embodiment of the floating point unit shown in FIG. 4, illustrating the handling of the rounding mode.

Turning next to FIG. 5, portions of a first embodiment of FPU 36 are shown illustrating the conveyance of a rounding mode with each instruction through the execution pipeline of FPU 36. FPU control unit 92, FPU core 94, FPU environment 88, and assembly queue 80 are shown. A first entry of assembly queue 80 is illustrated via an opcode storage 110, a register specifier storage 112, and a memory operand storage 114. Similar opcode storage, register specifier storage, and memory operand storage locations are included in assembly queue 80 for storing other instructions. Additionally, assembly queue 80 includes a control unit 116 and a rounding mode storage 118. FPU environment 88 includes a control word register 120. Additionally, several pipeline stages 122A–122D are illustrated within FPU control unit 92. Each pipeline state 122A–122D includes a field 124 for storing instruction information (e.g. opcode, operand information, etc.) and a field 126 for storing the rounding mode applicable to the instruction. FPU core 94 includes a pipeline as well, and as an alternative to storing the rounding mode in FPU control unit 92, the rounding mode may be pipelined within FPU core 94. Control unit 116 is coupled to rounding mode storage 118 and to opcode storage 110. Furthermore, control unit 116 receives a cancel CW update signal upon a conductor 128. Rounding mode storage 118 is further coupled to memory operand storage 114 and to control word register 120. Furthermore, rounding mode storage 118 is coupled to a first pipeline stage 122A. It is noted that, although portions of the internal circuitry of FPU control unit 92, FPU environment 88, and assembly queue 80 are shown in FIG. 5, additional internal circuitry (not shown) may be employed by each block for other functions.

Rounding mode storage 118 stores the rounding mode for FPU 36 which reflects the execution of any control word update instructions which have previously been executed, including any control word update instructions which are outstanding within the execution pipeline. Therefore, the rounding mode stored in rounding mode storage 118 may differ from the rounding mode stored in control word register 120 during clock cycles in which a control word update instruction is outstanding within the execution pipeline. As instructions are dispatched from assembly queue 80 into the execution pipeline, the rounding mode stored in rounding mode storage 118 is dispatched as well. As the instruction flows through pipeline stages 122, the corresponding rounding mode is carried along as well. When an instruction reaches the pipeline stage in which rounding is performed, the pipelined rounding mode is used to control the rounding.

According to one embodiment, the rounding mode comprises two bits. The two bits are encoded to select one of four possible rounding modes. A rounding mode encoding of '00' (binary) indicates that the rounding mode is round to nearest, in which the nearest representable number (in absolute value) to the precise result is selected as the rounded result. A rounding mode encoding of '01' indicates that the rounding mode is round down (or round to negative infinity), in which the precise result is rounded to the next numerically smaller representable value. A rounding mode encoding of '10' indicates that the rounding mode is round up (or round to positive infinity), in which the precise result is rounded to the next numerically larger representable value. Finally, a rounding mode encoding of '11' indicates that the rounding mode is truncate (or chop), in which the precise result is truncated to the number of significant bits which may be represented.

Control unit 116 controls the update of rounding mode storage 118. Control unit 116 receives the opcode of the instruction which is next to be dispatched into the execution pipeline. If the instruction is a control word update instruction, then control unit 116 causes the rounding mode portion of the updated control word to be copied into rounding mode storage 118 upon dispatch of the control word update instruction. In this manner, instructions subsequent to the control word update instruction receive the rounding mode provided by the updated control word. According to one embodiment, the control word update instruction is defined to store a memory operand into control word register 120. Therefore, rounding mode storage 118 is coupled to receive the portion of the value stored in memory operand storage 114 which comprises the rounding mode when the corresponding instruction is a control word update instruction. Control unit 116 causes rounding mode storage 118 to store the field provided from memory operand storage 114 upon dispatch of the control word update instruction.

Control unit 116 also updates rounding mode storage 118 upon detection of a canceled control word update instruction. Control unit 116 is informed that a control word update instruction has been canceled via assertion of the cancel CW update signal. Control unit 116 causes rounding mode storage 118 to store the rounding mode provided by control word register 120 upon assertion of the cancel CW update signal. FPU control unit 92 may provide the cancel CW update signal, for example. FPU control unit 92 may assert the signal upon receiving a cancel indication from reorder buffer 32 and the instruction being canceled is a control word update instruction. Alternatively, the cancel CW update signal may be asserted upon assertion of any cancel signal. The rounding mode would then be updated to the correct rounding mode if an update control word instruction were canceled, and the rounding mode would be updated to the same value that was stored in rounding mode storage 118 if the canceled instruction is not a control word update instruction. It is noted that, if the control word update instruction updates fields other than the rounding mode, then the execution pipeline is drained.

Figure 8:
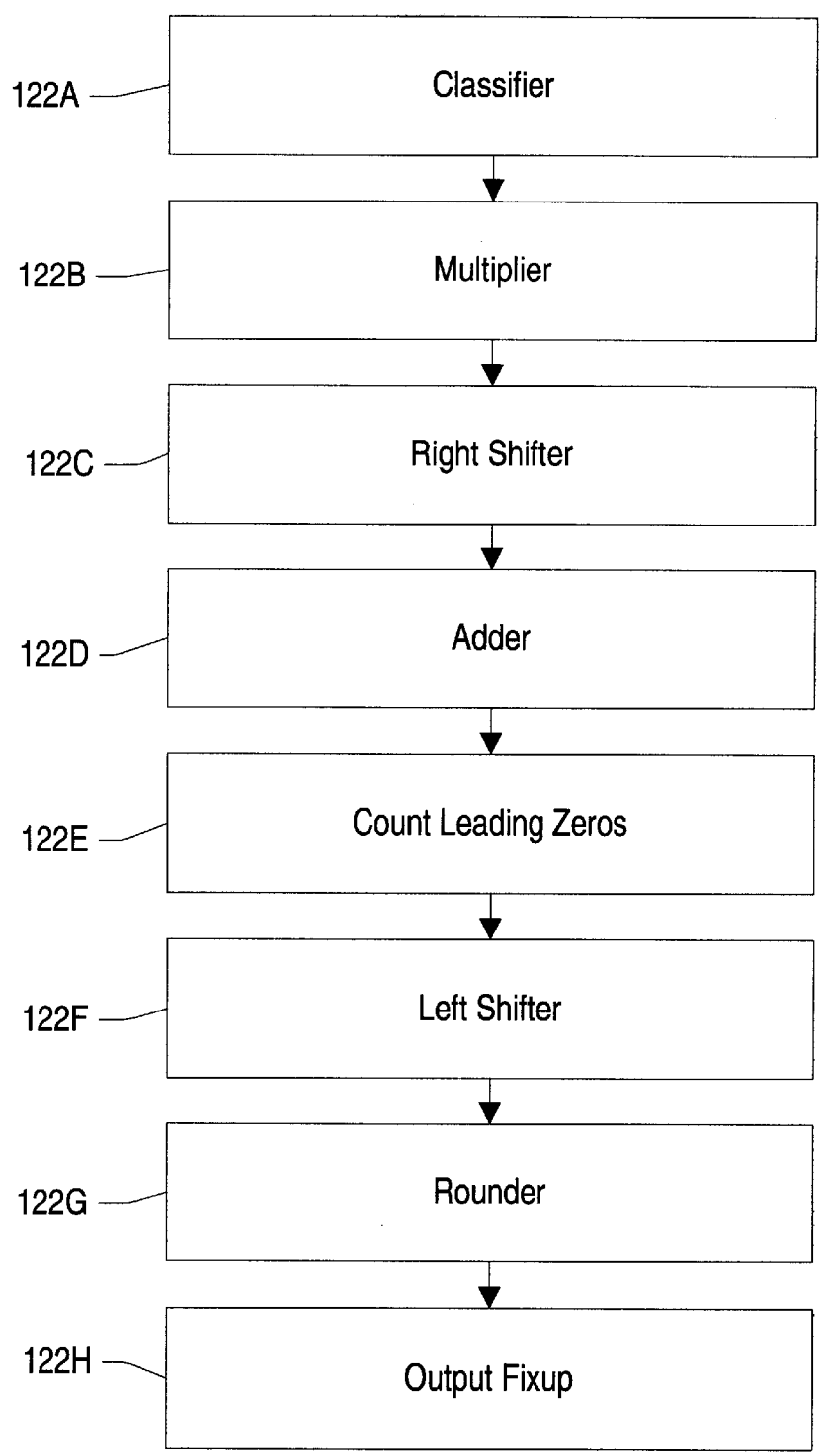
FIG. 8 is a pipeline diagram of one embodiment of the floating point unit shown in FIG. 4.

It is further noted that the number of pipeline stages 122 within FPU control unit 92 as shown in FIG. 5 is illustrative only. The execution pipeline of FPU 36 may include any number of stages. An exemplary execution pipeline for one embodiment of FPU 36 is shown in FIG. 8 below. Other embodiments may employ different stages to form an execution pipeline.

By conveying the rounding mode for each instruction with the instruction into the execution pipeline, FPU 36 may avoid serializing the update of the control word when only the rounding mode is to be updated. For applications in which changing the rounding mode is the most common reason for updating the control word, performance may be increased by the lack of serialization. Advantageously, rounding mode changes may be performed more often without serious performance degradation, allowing for applications which need to change the rounding mode often to achieve increased performance.

Figure 6:
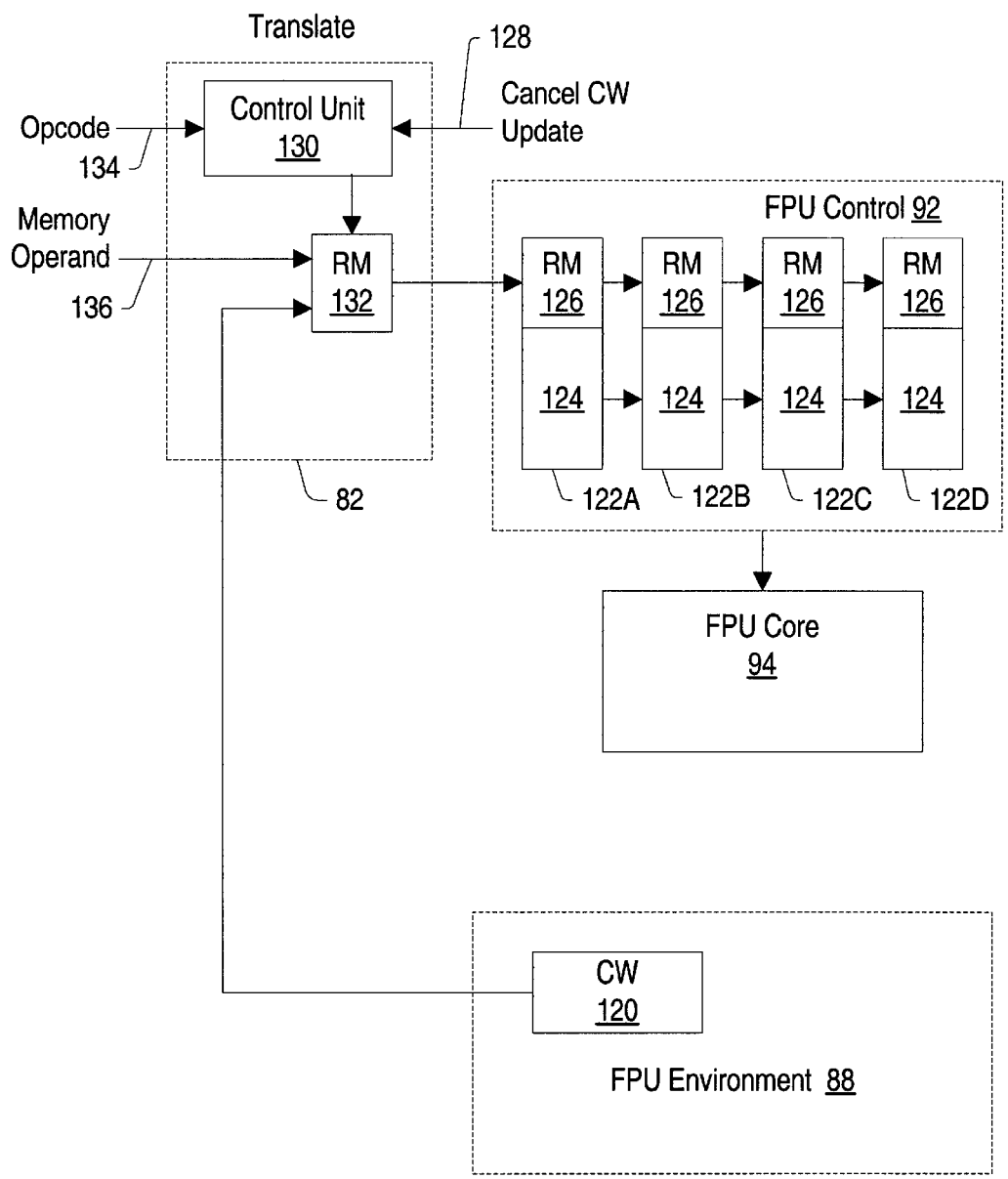
FIG. 6 is a diagram of portions of a second embodiment of the floating point unit shown in FIG. 4, illustrating an alternative handling of the rounding mode.

Turning now to FIG. 6, portions of a second embodiment of FPU 36 are shown illustrating the conveyance of a rounding mode with each instruction through the execution pipeline of FPU 36. FPU control unit 92, FPU core 94, FPU environment 88, and translate unit 82 are shown. Translate unit 82 includes a control unit 130 and a rounding mode storage 132. FPU environment 88 includes control word register 120, as shown in FIG. 6 above. Additionally, FPU control unit 92 includes several pipeline stages 122A–122D, each including a field 124 for storing instruction information (e.g. opcode, operand information, etc.) and a field 126 for storing the rounding mode applicable to the instruction. FPU core 94 includes a pipeline as well, and as an alternative to storing the rounding mode in FPU control unit 92, the rounding mode may be pipelined within FPU core 94. Control unit 130 is coupled to rounding mode storage 132. Control unit 130 receives a cancel CW update signal upon conductor 128, and further receives the opcode of the instruction being dispatched upon an opcode bus 134 from assembly queue 80. Rounding mode storage 132 is coupled to receive the rounding mode portion of the memory operand upon a memory operand bus 136 from assembly queue 80 and is further coupled to control word register 120. Furthermore, rounding mode storage 130 is coupled to a first pipeline stage 122A.

The embodiment shown in FIG. 6 locates rounding mode storage 132 and the associated control unit 130 within translate unit 82. Accordingly, the opcode and memory operand of the dispatching instruction are conveyed to translate unit 82 for detecting control word update instructions and storing the rounding mode portion of the updated control word into rounding mode storage 132. Similarly, control unit 130 is configured to cause rounding mode storage 132 to store the rounding mode portion of the control word stored in control word register 120 upon assertion of the cancel CW update signal upon conductor 128.

Figure 7:
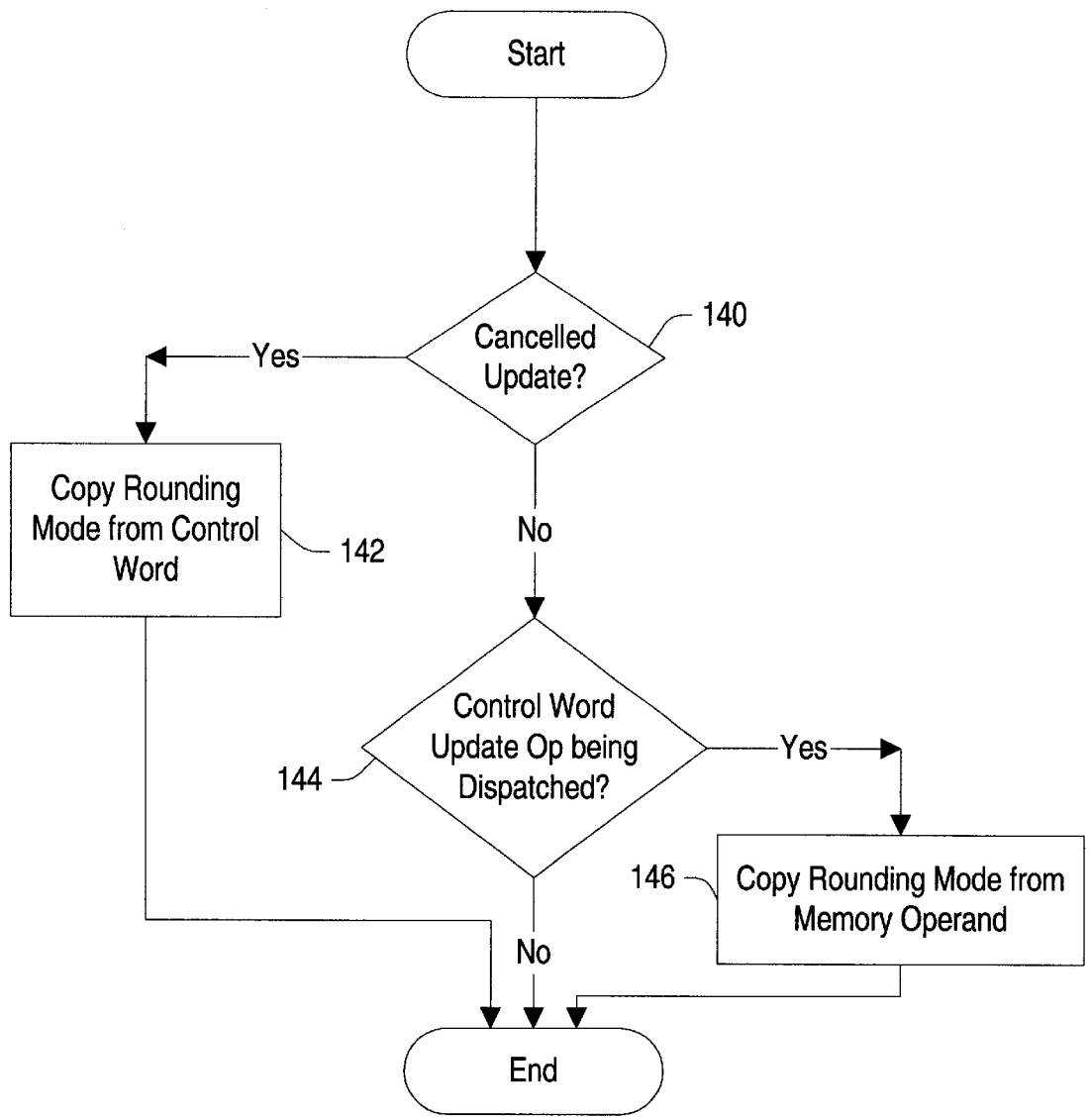
FIG. 7 is a flowchart of the operation of a control unit configured to handle rounding mode updates shown in FIGS. 5 or 6, according to one embodiment of the control unit.

Turning next to FIG. 7, a flow chart illustrating the operation of one embodiment of control unit 116 (for the embodiment shown in FIG. 5) or control unit 130 (for the embodiment shown in FIG. 6) is shown. The control unit first detects whether or not a canceled control word update instruction has been detected (decision block 140). If so, then the rounding mode stored in the rounding mode storage is copied from the control word stored in control word register 120 (step 142). If a canceled control word update instruction is not detected, then the control unit detects if a control word update instruction is being dispatched (decision block 144). If so, then the rounding mode stored in the rounding mode storage is updated from the updated control word provided as the memory operand of the control word update instruction (block 146). If neither a canceled control word update instruction nor a dispatching control word update instruction is detected, then the rounding mode stored in the rounding mode storage is left unmodified. As mentioned above, the rounding mode is conveyed into the execution pipeline along with each instruction.

Turning next to FIG. 8, an exemplary execution pipeline 150 which may be employed by one embodiment of FPU 36 is shown. Other embodiments of FPU 36 may employ any number of pipeline stages and may divide the floating point functionality among the stages in any desirable fashion.

Pipeline 150 includes stages 122A–122H. A given instruction may skip one or more pipeline stages if the instruction does not require any of the hardware at the skipped stage. For example, a floating point addition does not require multiplication, and therefore may skip pipeline stage 122B.

A classifier stage 122A is provided for preparing operands for addition. The exponents of the two operands are subtracted to determine the shift amount needed upon one of the significands prior to the addition. In a later pipeline stage, the significand from the operand having the smaller exponent (in absolute value) is shifted such that it represents the corresponding operand with an exponent equal to that of the operand having the larger exponent. The shifted significand can then be added to the significand of the operand having the larger exponent, and the resulting significand is the result of the instruction with an exponent equal to the larger exponent.

Multiplier stage 122B is used to perform multiplication of floating point numbers. Similarly, right shift stage 122C performs right shift operations. For example, right shift stage 122C may be used to perform the significand shift operation described above. Adder stage 122D performs the addition of floating point numbers. Count leading zeros stage 122E is used to count the leading zeros in the result significand, in order to place the result into normal form (i.e. one binary one digit to the left of the decimal point). Left shifter stage 122F left shifts the significand according to the number of leading zeros provided by count leading zeros stage 122E, and adjusts the exponent accordingly. Rounder stage 122G rounds the result according to the rounding mode which was conveyed with the corresponding instruction. Finally, output fixup stage 122H is used to force the special encodings (zero, infinity, denormalized number, etc.) if the input operands or the result are special numbers. It is noted that, according to one embodiment, rounder stage 122G performs only the rounding of floating point numbers in accordance with the rounding mode conveyed with the instruction. It is noted than many other datapaths are possible. For example, the add and round operations may be performed in a single pipeline stage, etc.

It is noted that both FPU control unit 92 and FPU core 94 may implement execution pipeline 150. FPU control unit 92 conveys control information through its pipeline, and FPU core 94 conveys the operand values and intermediate results between the corresponding pipeline stages. Circuitry at each stage in the pipeline of FPU control unit 92 controls the corresponding circuitry within the pipeline of FPU core 94 according to control information for the instruction.

Figure 9:
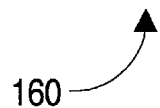
FIG. 9 is a block diagram of one embodiment of a control word.

Turning now to FIG. 9, a diagram of a control word 160 which may be employed according to one embodiment of FPU 36 is shown. Control word 160 is the control word defined by the x86 microprocessor architecture. Control word 160 includes a pair of reserved fields 162 and 164. Generally, reserved fields 162 and 164 are ignored by FPU 36 and are reserved for future expansion of control word 160. A rounding mode field 166 is included for storing the rounding mode. Additionally, a precision control field 168 is included for defining the precision mode of FPU 36. Precision control field 168 may be encoded to indicate single, double, or extended precision. Finally, control word 160 includes an exception masks field 170. A bit within exception masks field 170 is included for each type of floating point exception. If the mask bit is set, then the exception is disabled. If the mask bit is clear, the exception is enabled.

Figure 10:
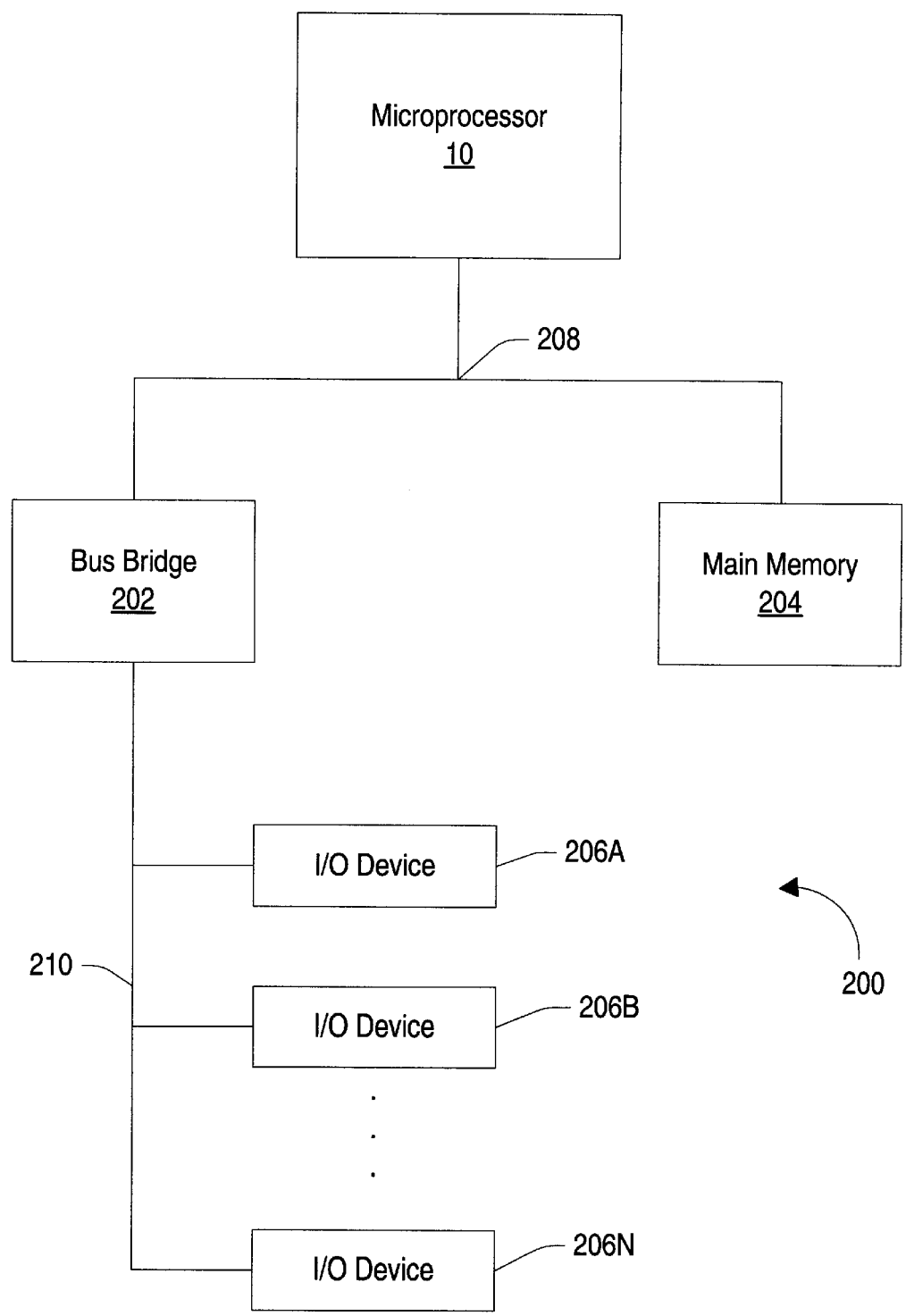
FIG. 10 is a block diagram of one embodiment of a computer system including the microprocessor shown in FIG. 1.

Turning now to FIG. 10, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 10 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration. It is still further noted that the functions of bus bridge 202, main memory 204, and the cache memory may be integrated into a chipset which interfaces to microprocessor 10.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 1 below indicates fast path, double dispatch, and MROM instructions for one embodiment of microprocessor 10 employing the x86 instruction set:

TABLE 1 x86 Fast Path, Double Dispatch, and MROM Instructions

| X86 Instruction | Instruction category |
|---|---|
| AAA | MROM |
| AAD | MROM |
| AAM | MROM |
| AAS | MROM |
| ADC | fast path |
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |
| CALL | fast path/double dispatch |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | double dispatch |
| IN | MROM |
| INC | fast path |
| INS | MROM |
| INSB | MROM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | double dispatch |
| JECXZ | double dispatch |
| JMP | fast path |
| LAHF | fast path |
| LAR | MROM |
| LDS | MROM |
| LES | MROM |
| LFS | MROM |

TABLE 1-continued x86 Fast Path, Double Dispatch, and MROM Instructions

| X86 Instruction | Instruction category |
|---|---|
| LGS | MROM |
| LSS | MROM |
| LEA | fast path |
| LEAVE | double dispatch |
| LGDT | MROM |
| LIDT | MROM |
| LLDT | MROM |
| LMSW | MROM |
| LODS | MROM |
| LODSB | MROM |
| LODSW | MROM |
| LODSD | MROM |
| LOOP | double dispatch |
| LOOPcond | MROM |
| LSL | MROM |
| LTR | MROM |
| MOV | fast path |
| MOVCC | fast path |
| MOV.CR | MROM |
| MOV.DR | MROM |
| MOVS | MROM |
| MOVSB | MROM |
| MOVSW | MROM |
| MOVSD | MROM |
| MOVSX | fast path |
| MOVZX | fast path |
| MUL | double dispatch |
| NEG | fast path |
| NOP | fast path |
| NOT | fast path |
| OR | fast path |
| OUT | MROM |
| OUTS | MROM |
| OUTSB | MROM |
| OUTSW | MROM |
| OUTSD | MROM |
| POP | double dispatch |
| POPA | MROM |
| POPAD | MROM |
| POPF | MROM |
| POPFD | MROM |
| PUSH | fast path/double dispatch |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | double dispatch |
| RSM | MROM |
| SAHF | fast path |
| SAL | fast path |
| SAR | fast path |
| SHL | fast path |
| SHR | fast path |
| SBB | fast path |
| SCAS | double dispatch |
| SCASB | MROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |
| VERR | MROM |
| VERW | MROM |
| WBINVD | MROM |
| WRMSR | MROM |
| XADD | MROM |
| XCHG | MROM |
| XLAT | fast path |
| XLATB | fast path |
| XOR | fast path |

Note: Instructions including an SIB byte are also considered double dispatch instructions. Furthermore, floating point instructions are considered to be MROM instructions.

In accordance with the above disclosure, a floating point unit has been shown which conveys the rounding mode corresponding to a particular instruction with that particular instruction into the execution pipeline. The rounding mode is updated as control word update instructions are dispatched, such that subsequent instructions receive the updated rounding mode. Advantageously, the control word update instruction may be performed in a non-serialized manner if the only update is to the rounding mode. If other portions of the control word are updated, the instructions subsequent to the control word update instruction may be discarded and refetched. Performance of those applications which change the rounding mode often may advantageously be increased.

Numerous variations and modifications will become apparent to those skilled in the art once the above disclosure is fully appreciated. It is intended that the following claims be interpreted to embrace all such variations and modifications.

What is claimed is:

1. A floating point unit for a microprocessor comprising:
an execution pipeline;
a rounding mode storage circuit coupled to said execution pipeline
a control word storage circuit coupled to the rounding mode storage circuit;
wherein said rounding mode storage circuit and said control word storage circuit are configured to store a rounding mode indicative of a type of rounding to be applied to results of floating point instructions;
a control unit circuit coupled to said rounding mode storage circuit, wherein said control unit circuit is configured to detect a dispatched control word update instruction, and wherein said control unit circuit is configured to update said rounding mode storage circuit with an updated rounding mode in response to said control unit circuit detecting the dispatched control word update instruction, wherein said control unit circuit updates said rounding mode storage circuit prior to execution of the dispatched control word update instruction;

wherein said execution pipeline is configured to receive said updated rounding mode along with a particular instruction as said particular instruction is dispatched into said execution pipeline, and wherein the execution pipeline is further configured to round a particular result corresponding to said particular instruction according to said updated rounding mode;

wherein the control word storage circuit is configured to be updated with the updated rounding mode after execution of the dispatched control word update instruction.

2. The floating point unit as recited in claim 1 wherein said execution pipeline comprises a rounding stage at which rounding is performed, wherein said rounding stage is coupled to receive said rounding mode and to round said particular result accordingly.

3. The floating point unit as recited in claim 2 wherein said rounding stage is configured to perform only said rounding.

4. The floating point unit as recited in claim 1 further comprising an assembly queue coupled to said execution pipeline and coupled to receive floating point instructions and to store said floating point instructions until corresponding memory operands are received.

5. The floating point unit as recited in claim 4 wherein said assembly queue includes said rounding mode storage.

6. The floating point unit as recited in claim 1 wherein said control word update instruction comprises a memory operand, and wherein said memory operand is an updated control word to be stored by said floating point unit upon execution of said control word update instruction.

7. The floating point unit as recited in claim 6 wherein said rounding mode storage is updated with a rounding mode portion of said updated control word.

8. The floating point unit as recited in claim 1 wherein said control unit circuit is coupled to receive an indication that a control word update instruction is canceled from said execution pipeline.

9. The floating point unit as recited in claim 8 further comprising a control word register configured to store a current control word.

10. The floating point unit as recited in claim 9 wherein said rounding mode storage is coupled to said control word register, and wherein said control unit is configured to cause said rounding mode storage to store a rounding mode portion of said current control word upon receiving said indication.

11. A microprocessor comprising:

a floating point unit including an execution pipeline, wherein said floating point unit is configured to convey a rounding mode stored in a first rounding mode storage circuit along with each instruction into said execution pipeline, wherein said floating point unit is configured to update said rounding mode stored in a first rounding mode storage circuit with an updated rounding mode in response to dispatching a control word update instruction, and wherein said floating point unit is configured to update a second rounding mode storage circuit with the updated rounding mode in response to execution of the control word update instruction; and a reorder buffer coupled to said floating point unit, wherein said reorder buffer is configured to process instruction exceptions, and wherein said reorder buffer is further configured to convey a cancel indication to said floating point unit if one or more floating point instructions are canceled in response to one of said instruction exceptions.

12. The microprocessor as recited in claim 11 wherein said floating point unit is configured to update said first rounding mode storage circuit before a second rounding mode stored in second storage circuit before the second storage circuit is updated with the updated rounding mode if said cancel indication is received from said reorder buffer.

13. A method for performing rounding in a floating point unit comprising:

storing a current rounding mode in a first storage circuit;

storing the current rounding mode in a second storage circuit;

conveying the current rounding mode stored in the first storage circuit along with a floating point instruction into an execution pipeline of said floating point unit; and updating said first storage circuit with an updated rounding mode upon dispatch of a control word update instruction into said execution pipeline, wherein said updating occurs before execution of the control word update instruction;

updating said second storage circuit with said updated rounding mode after execution of the control word update instruction.

* * * * *

UNITED STATES PATENT AND TRADEMARK OFFICE
CERTIFICATE OF CORRECTION

PATENT NO.    : 6,233,672 B1                                              Page 1 of 1
DATED         : May 15, 2001
INVENTOR(S)   : Thomas W. Lynch It is certified that error appears in the above-identified patent and that said Letters Patent is hereby corrected as shown below:

<u>Column 26, claim 12,</u>
Line 24, please delete "before" and insert in its place -- with --.

Signed and Sealed this

Twelfth Day of March, 2002

Attest:

Attesting Officer

JAMES E. ROGAN
Director of the United States Patent and Trademark Office